Patented Feb. 15, 1938

2,108,276

UNITED STATES PATENT OFFICE 2,108,276

JOINT COMPOUND

Lewis L. Wadsworth, Winchester, Mass.

No Drawing. Application January 4, 1936,
Serial No. 57,515

3 Claims. (Cl. 106—8)

My invention relates to an improved joint compound intended especially for sealing the joints between sections of water pipes and my object is to provide a product that is cheap, easily applied, whose volume does not change in use, unaffected by water and by which tight, strong and rigid joints may be secured. To this end my improvement consists of the following:

I first take the desired quantity of Portland or hydraulic cement, preferably a quick setting cement, of which a number of brands are available on the market. It will be assumed that two pounds of cement are used.

I next employ a very small quantity of finely powdered pure aluminum. The preferable proportion of the aluminum powder is .02 of one per cent of the weight of the cement. This proportion may however vary as much as fifty per cent either way. I find that by making use of a minute quantity of aluminum the tendency of the cement to contract in setting is overcome. Too large an amount of aluminum results in weakness.

The next ingredient in the cement mixture is iron filings, finely divided and degreased. The preferable quantity of iron filings used is four per cent of the weight of the cement but good results are secured if the quantity is varied as much as twenty per-cent either way. In use the iron filings are apparently oxidized whereby the resulting iron oxide will tend to plug any minute channel which may form in the cement mixture.

The next ingredient employed is lamp black which adds a pleasant color to the mixture and also tends to fill any voids which may be formed in the cement during setting. A satisfactory proportion of lamp black is two per cent by weight of the cement but this may vary as much as five per cent either way.

I next employ a relatively large amount of fine, sharp and clean sand. This ingredient adds cheapness to the cement without at the same time detracting from its strength. Preferably the amount of sand used is one-fourth of the bulk of the cement but this may vary as much as ten per cent either way.

The final ingredient employed is finely divided hydrated lime, preferably in the proportion of one-tenth of the bulk of the cement although this amount may vary as much as five per cent either way. By employing hydrated lime, the mixture pours more easily and the lime probably adds to the water-proofing character of the mixture.

The several ingredients are intimately mixed dry, care being taken to exclude moisture, the presence of which will deleteriously effect the cement and aluminum and, to some extent also, the iron filings. Therefore the mixture should be kept in air tight closures such as cans, drums or water-proof bags.

When the compound is to be used, sufficient water is added to permit the compound to be poured around the joint. After drying and setting the result will be a water tight seal having no crevices or cracks through which water may escape. The essential ingredients of my improved cement are the hydraulic cement and aluminum. The other ingredients add desirable characteristics to the mixture and are preferably used.

What I claim as new therein and desire to secure by Letters Patent is as follows:

1. An improved joint compound comprising substantially the following elements: Quick-setting cement, two pounds, finely divided metallic aluminum, .02 of one per cent of the weight of the cement, finely divided, degreased iron filings, four per cent of the weight of cement, lamp black, two per cent of the weight of cement, fine, sharp clear sand, one-fourth of the bulk of cement, finely powdered hydraulic lime, one-tenth of the bulk of cement.

2. An improved non-expansible and non-contractible joint compound for securing water tight seals between sections of water pipe and the like, comprising hydraulic cement and approximately .02 of 1% by weight of powdered metallic aluminum, whereby when the compound is applied to the joint as a watery paste, the bulk of the solid constituents will remain substantially unchanged notwithstanding evaporation of water, said compound also containing finely divided degreased iron filings in the proportion of from 3 to 5% of the weight of the cement.

3. An improved non-expansible and non-contractible joint compound for securing water tight seals between sections of water pipe and the like, comprising hydraulic cement and approximately .02 of 1% by weight of powdered metallic aluminum, whereby when the compound is applied to the joint as a watery paste the bulk of the solid constituents will remain substantially unchanged, notwithstanding evaporation of water, said compound also containing finely divided degreased iron filings in the proportion of from 3 to 5% of the weight of the cement, and also containing finely powdered hydrated lime in approximately one-tenth of the bulk of the cement.

LEWIS L. WADSWORTH.